Patented Jan. 9, 1923.

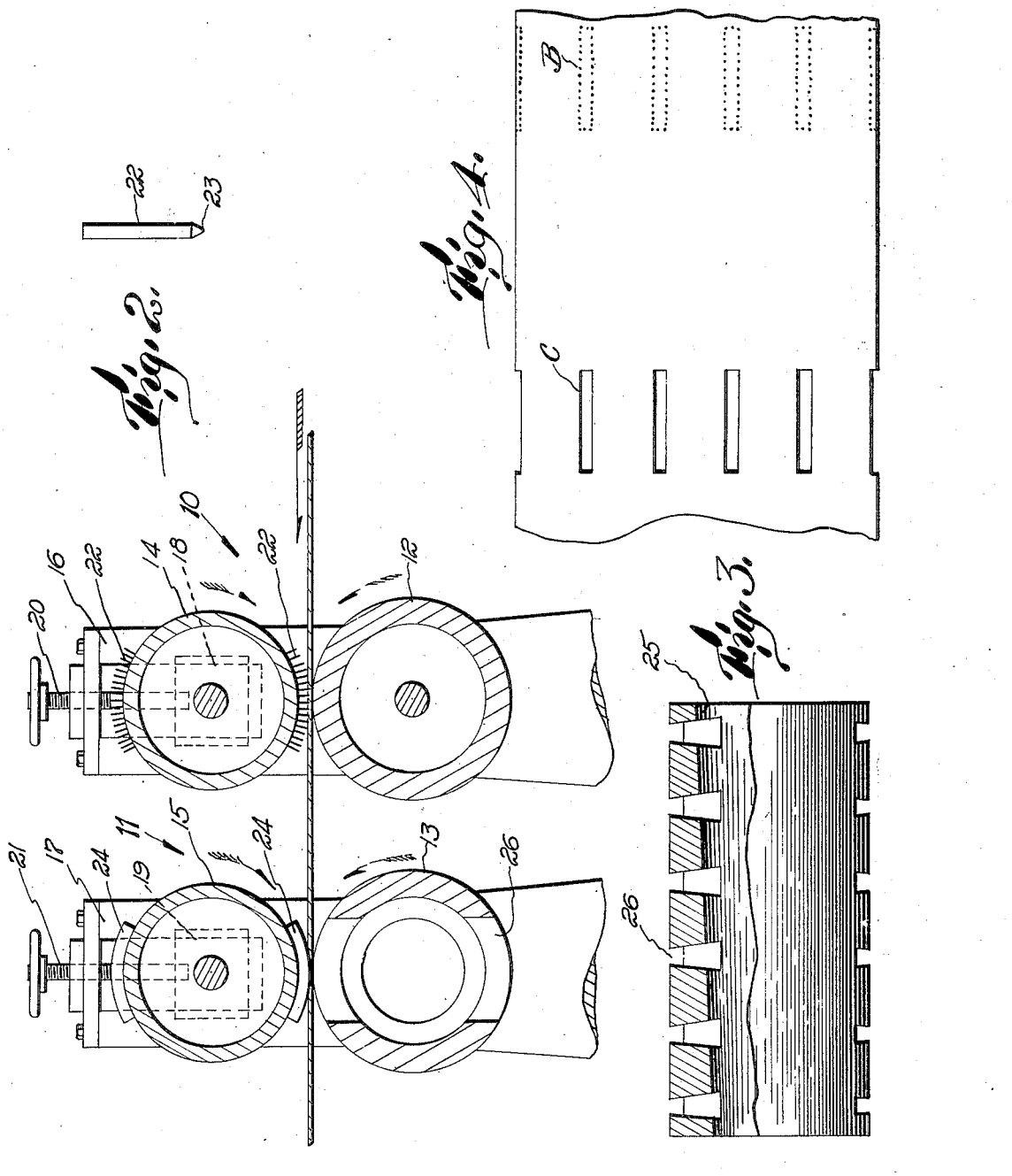

1,441,708

UNITED STATES PATENT OFFICE.

FREDERICK C. OVERBURY, OF HILLSDALE, NEW JERSEY, ASSIGNOR TO THE FLINT-KOTE COMPANY, OF BOSTON, MASSACHUSETTS, A CORPORATION OF MASSACHUSETTS.

MACHINE FOR CUTTING SLOTS IN RAW FELT.

Application filed September 15, 1920. Serial No. 410,477.

*To all whom it may concern:*

Be it known that I, FREDERICK C. OVERBURY, a citizen of the United States, residing at Hillsdale, in the county of Bergen and State of New Jersey, have invented new and useful Improvements in Machines for Cutting Slots in Raw Felt, of which the following is a specification.

The present invention relates to the cutting mechanism of machines for cutting slots in a sheet of flexible material, and has especial application in cutting slots or apertures in the raw fibrous material or felt, such, for instance, as when saturated and coated, is used for covering roofs and walls of buildings, and is commonly known as roofing material.

Roofing material of the above character comprises, generally speaking, a body of fibrous material, usually of wool felt saturated with a waterproofing compound as asphalt and coated on one surface with waterproofing material as asphalt of a comparatively high melting point. Previous to its saturation, the felt is tough and difficult to cut, and, when cut by ordinary means now in use, there is likelihood of tearing the material, making an irregular or ragged edge adjacent the cut and in this manner damaging the sheet. Upon the coating there is frequently superposed a surfacing of crushed mineral material as slate, partially embedded in the thin coating, which adds to the toughness of the sheet and to the difficulty of cutting the same.

The invention has for its object, first to provide simple and effective means for making a cut in roofing felt or the like, and for making slots therein without tearing the material adjacent the cut. The invention has also for its object to provide means whereby such slots are cut at intervals in the sheet of roofing as it passes progressively through the machine. Other objects and advantages will appear in the course of the present application.

The above objects are preferably accomplished in my invention by first weakening the fiber of the felt on the lines to be cut, by the use of punches or spikes mounted in spaced-apart groups on the periphery of the cylinder, and arranged so as to outline the slot to be cut and then cutting the fiber on the lines so weakened by cutting mechanism arranged in spaced relation similar to the groups of spikes to cut the fiber through, and remove the cuttings.

On the accompanying drawings,—

Figure 1 is a section taken vertically through mechanism of the machine.

Figure 2 is a detail view of one of the punches.

Figure 3 is a section through one of the cylinders, showing the sloping bore thereof.

Figure 4 is a sheet of material showing punched outlines of a slot and the finished slots.

I will now describe the invention in detail, referring to the drawings by reference numerals, the same numerals designating the same parts in all views of the drawings.

The invention comprises preferably two pairs of rolls 10 and 11 between which a sheet of material to be cut or slotted may be passed, and which pairs comprise bed rolls 12 and 13 of hard material as steel, and carrier rolls 14 and 15 adjustably mounted adjacent thereto. The pairs of rolls are respectively journalled between pairs of suitable supports 16 and 17, only one of each pair being shown, and the carrier rolls 14 and 15 are respectively journalled in adjustable journal boxes 18 and 19 which may be advanced and retracted to properly position the carrier rolls 14 and 15 with respect to bed rolls 12 and 13, by suitable means as by adjusting screws 20 and 21.

The carrier roll 14 is provided with groups of spikes or punches 22 spaced at regular intervals circumferentially and longitudinally of the roll and adapted to punch an outline on a sheet of material. The punches 22 are of hard material as steel and have their ends pointed and slightly blunt as at 23 to adapt them to more readily pierce material presented thereto. The punches are preferably spaced apart slightly in the groups and may be arranged to outline a slot or aperture to be cut in the sheet of material passed between the rolls. The adjustment of the roll 14 to the roll 12 in operation is preferably such that, when a sheet of material is passed between them, the bed roll will press the material firmly against the punches when said punches are in position to operate on the material. The carrier roll 15 of the second pair of rolls is of the same dimensions as roll 14 and is provided on its periphery with sector-shaped cutting members 24. The cutting members 24 are equal in number and are correspondingly positioned on the roll 15 to the groups of punches 22 on roll 14 and viewed in plan, present a configuration substantially equal in area and shape to the outline formed by the punches. The bed roll 13, cooperating with the carrier roll 15, is of the same dimensions as bed roll 12 and is preferably a hollow cylinder, having a tapered open-ended bore 25 for a purpose which will appear. In the periphery of the roll 15 are formed apertures 26, equal in number and corresponding in dimensions and in location to the members 24 on the carrier roll 15, and are of a size such that the members may be received therein. The roll 15 is preferably adjusted in relation to roll 13 so that the operating portion of the cutting members enter the apertures a slight distance when in cooperating position relative thereto.

Both the members and the walls about the apertures present sharp edges whereby the material of a sheet which passing between the rollers and which rest above the apertures when the members are in operative relation with said apertures, is cut from the sheet by the shearing action of the members and the edges about the aperture. The apertures 25 communicate with the bore of the roll 13 and the walls thereof may be flared inwardly so as to present a wider opening at their inner end permitting the material cut from the sheet to drop readily into the bore of the roller. The rollers 12, 13, 14 and 15 are arranged to rotate in synchronism with each other so that a sheet of material passed between the rollers and having outlines formed thereon as set forth above will have such portions presented to the second pair of rolls 13 and 15 in position for the members 24 to operate on the portion of the sheet outlined by the punches and on no other. The roll 13 also rotates in unison with roll 15 so as to bring apertures 26 synchronously into position to cooperate with the cutting member 24. By means of the above construction, sheets of material to have slots or apertures cut therein and passed between the rollers have the slots or apertures first outlined on the sheet by the punches 22 on roll 14 which, as stated above, weaken the material along the outline. The portions so outlined then pass between the rollers 13 and 15 and the members 24 cooperating with the edges about the apertures 26 shear the material so outlined from the sheet. The material so severed, drops through the slot 26 into the cylinder and gravitates along the tapering bore thereof to the open end and is deposited on the floor or into a suitable receptacle. The weakening of the material by the punches 22 renders it easily severable by the shearing action of the cutting member 24 and the edges of the slot 26 without tearing the fabric about the slot and a clean cut is made.

On the drawings, the arrangements of the punches and the cutting members are shown to be such that they will outline and punch out the material to form apertures longitudinally of the sheet of material (see B and C, Figure 4). It is obvious, however, that they may be arranged to cut slots transversely of the sheet and that the arrangement of the punching and cutting members may be such as to cut apertures of any configuration.

Having thus explained the nature of my said invention and described a way of making and using the same, although without attempting to set forth all of the forms in which it may be made or all of the modes of its use, what is claimed is:

1. In a machine for cutting sheets of flexible material, means for cutting through the material at spaced points to weaken it on the lines to be cut, and means in synchronized relation therewith for completing the cutting of the material on the lines so weakened.

2. In a machine of the character stated, means for outlining a portion of a sheet of material to be severed therefrom, and to weaken the material along said outline, comprising a plurality of punches arranged in the form of said outline, and means synchronized with said first-named means for severing the material along said outline, comprising cutting members arranged in the size and configuration of said outline cooperating with a roll having slots therein, the edges of which coact with said members in a shearing or cutting action.

3. In a machine of the character stated, bed cylinders of hard material, carrier cylinders adjustably mounted one above each bed cylinder, punches arranged in a group on the periphery of one of said carrier cylinders, said punches outlining a definite configuration, a cutting member on the second carrier cylinder adapted to come to operative position synchronously with said group punches, said bed cylinders cooperating each with its respective carrier cylinder in operating on material passed between said rolls.

4. In a machine of the character stated, pairs of rolls journalled between supports, between which rolls a sheet of material may be progressively passed, each pair comprising a bed roll and a carrier roll, a plurality of punches on one of said carrier rolls arranged to outline an area of given size and configuration, a cutting member on the other carrier roll of like size and configuration to the outline made by the punches, the punches and cutting members being so arranged and the cylinders being so synchronized to rotate relative to each other that a sheet of material passed progressively between the first-named pair of rolls and the second-named pair will have spaced areas outlined thereon by the punches and the material weakened on said outline, which area will be afterwards severed by cutting member cooperating with its bed roll on said weakened lines.

5. In a machine of the character stated, pairs of rolls adapted to rotate in unison and to have a sheet of flexible material passed therebetween, one of said rolls having punches thereon arranged to outline a portion of material to be severed from the sheet and to weaken the material along said outline, the second pair of rolls adapted to have said sheet pass therebetween, one of said rolls having a member thereon for severing said material along said outlines, the second pair of rollers being synchronized relative to the first pair, so that the material to be severed will be in proper position to be severed when the cutting member is in position to operate.

6. In a machine of the character stated, a pair of bed rolls, groups of punches arranged to cooperate with one of said bed rolls to form an outline, cutting members each having an outline of like size and configuration to that formed by a group of punches cooperating with the other of said bed rolls, means for carrying said punches, and means carrying said cutting members.

7. In a machine of the character stated, a pair of bed rolls, and a pair of carrier rolls, punches arranged in a group on one of said carrier rolls and cooperating with one of said bed rolls to punch an outline on a sheet of material passed between said carrier and head rolls, and cutting members arranged on the other of said carrier rolls to sever the material so outlined from said sheet.

8. In a machine of the character stated, a pair of bed rolls and a pair of carrier rolls, punches arranged in a group on one of said carrier rolls and cooperating with one of said bed rolls to punch an outline on a sheet of material passed between said rolls, means arranged on the other of said carrier rolls to sever the material so outlined from said sheet, and means for adjusting the carrier rolls in relation to the bed rolls.

9. In a machine of the character stated, pairs of rolls comprising bed rolls and carrier rolls corresponding therewith, said rolls being mounted to rotate in unison, one of said carrier rolls having spaced groups of punches extending therefrom, said groups outlining an area of given size and dimensions, and cooperating with one of said bed rolls to outline a similar area on a sheet of material passed between said rolls and to weaken the material along said outline, cutting members on the other carrier roller cooperating with the corresponding bed roller to cut the material along said weakened lines, apertures in said second bed rolls through which the severed material passes when so severed, said second bed cylinder having a tapered bore with which said aperture communicates.

In testimony whereof I have affixed my signature.

FREDERICK C. OVERBURY.